UNITED STATES PATENT OFFICE.

WILLIAM A. HAMOR AND CHARLES W. TRIGG, OF PITTSBURGH, PENNSYLVANIA, ASSIGNORS TO JOHN E. KING, OF DETROIT, MICHIGAN.

PROCESS FOR PRESERVING FUGACIOUS COMPONENTS OF FOODS.

1,292,458. Specification of Letters Patent. Patented Jan. 28, 1919.

No Drawing. Application filed March 29, 1917. Serial No. 158,158.

*To all whom it may concern:*

Be it known that we, WILLIAM A. HAMOR and CHARLES W. TRIGG, citizens of the United States, residing at Pittsburgh, county of Allegheny, State of Pennsylvania, have invented a certain new and useful Improvement in Processes for Preserving Fugacious Components of Foods, and declare the following to be a full, clear, and exact description of the same, such as will enable others skilled in the art to which it pertains to make and use the same, reference being had to the accompanying drawings, which form a part of this specification.

Our discovery relating to the preservation of the aromatic properties of foods, etc., is embodied in a process for the recovery of volatile aromatic and flavoring substances escaping during the preparation of extracts of foods or of dried, dehydrated, desiccated or canned comestible or potable organic substances.

The discovery is more particularly directed to the preparation of a pulverulent or molded solid water-soluble coffee-extract which will contain substantially all the aromatic and flavoring constitutents of the roasted coffee-bean.

In the prior art a great many attempts have been made to prepare water-soluble coffee-extracts in solid form, but in many of the processes proposed the aromas are lost by reason of being driven off in the process of evaporating the water solution or extract of the coffee to secure the soluble extract. Various other methods have been proposed with a view to preserving the aromas; for instance, the coffee-beans have been subjected to a solvent intended to dissolve out the volatile, aromatic and flavoring constituents; or the ground coffee is subjected to repeated infusions with cold water for extracting the caffein and the volatile oils before the concentration to dryness of the coffee decoction to secure a pulverulent extract is effected. It has been proposed to recover the volatile oils or aromatic substances by means of steam distillation. It has also been proposed to absorb these volatile oils in an absorbent or carrying medium which is combined and retained with the extract and becomes part of the coffee decoction prepared from the extract. So far as we are informed these processes have not been commercially successful, for they fail to make possible practical duplication of the decoction made directly from roasted ground coffee-berries.

It is the purpose of our process to catch and retain the most delicate aromas of properly roasted coffee and add them to the coffee-extract, so that the water-soluble coffee-extract will practically duplicate the decoction made directly from the ground roasted berries.

Our process in its broad aspect consists in catching the aroma whenever it escapes from the coffee-berries and adding it to the evaporated coffee-extract. The broad process is applicable to the process of making coffee decoction, the operation of boiling or evaporating the coffee solution to produce the coffee-extract, the operation of roasting coffee, and the operation of grinding. Or, our process is applicable to evaporation of solvents primarily intended to recover caffein but which also retain the aromas, or our process is applicable to any operation wherein the volatile oils or aromatic substances escape.

The aroma of roasted coffee is often spoken of as the volatile oils or the essential oils of the coffee. These fugacious aromatic components of roasted coffee which give it a pleasing flavor and odor, are very often designated as "caffeol." We, therefore, use the term "caffeol," for clearness and brevity of reference, to mean all those aromas, volatile oils, etc., which give the coffee its pleasing flavor and odor. Hence "caffeol" is used substantially as a synonym for the volatile aromatic and flavoring constituents, oils and essential oils, etc., of roasted coffee.

The roasted coffee, properly ground, is extracted with a suitable amount of water at a suitable temperature, which is substantially the same as preparing the ordinary coffee decoction. After the separation of the coffee-extract from the grounds, the solution is evaporated to dryness by any of the well-known methods, as for instance, in a vacuum drum drier. At any stage of this process wherein the caffeol escapes, our "enfleurage" process is applied. "Enfleurage," as we broadly understand, define, and apply the term, is the absorption or retention of volatile, fugacious, aromatic and flavoring substances of various vegetable, animal, or mineral oils, fats and waxes. Our process consists in passing the caffeol or aromas of the coffee, or the air, gases or vapors containing them, into contact with a suitable caffeol absorbent. This contact may be effected in a variety of ways, as passing the air or gases or vapors over or bubbling or drawing or forcing them through the absorbent. The absorbent may be some solid or liquid oil, hydrocarbon complex, fat or wax, or derivative, for instance, glycerol, which is a derivative. Glycerol-substitutes, such as "Nulomoline", ethylene glycol and propylene glycol, may also be used. These may be alone or in combination. A great variety of oils, vaseline-like products, fats and waxes are known to be capable of absorbing fugacious aromas of the type of caffeol, so it is impractical to enumerate all such absorbents. However, in selecting a suitable absorbent, the following characteristics will be found desirable:— high boiling-point, and non-volatile, neutral and preferably non-odorous properties, and high or even jelly-like viscosity. We have found that petrolatum or vaseline and liquid petrolatum are admirably suited to act as absorbents in our process, but these are named merely as examples and we do not wish to be limited to absorbents of this character only.

Caffeol is re-claimed from the absorbent by shaking the absorbent containing the caffeol with a suitable caffeol solvent, preferably water or a volatile, or non-volatile, organic solvent, such as an alcohol, an ether, an ester, benzol, pentane, or other hydrocarbon or hydrocarbon complex, a chlorid of carbon, carbon disulfid, etc., alone or in combination, at a suitable pressure and temperature, which will not permit of the volatilization of the solvent or aroma. When complete extraction of the caffeol has been effected, the oil, fat or wax, or other absorbent, which has been used, is separated from the solvent by simple separation, as by decanting, filtering, etc., to prevent re-absorption of the aroma. The solution is then chilled to a suitably low temperature to precipitate out any of the absorbing oil, fat or wax which may have been dissolved in the solvent. The temperature, of course, will vary with the character of the absorbent and the nature of the solvent used. With the use of petrolatum and pentane, we find a temperature in the neighborhood of minus 10 degrees centigrade very suitable to effect this object. The precipitate may then be separated, as by filtering, or the separation may be facilitated by the use of a centrifuge.

The caffeol in the solution may then be separated by any known way before or after addition to the previously prepared solid or pulverulent coffee-extract. However, we prefer to add the solution to the previously prepared coffee-extract and evaporate the solvent under proper conditions of temperature and pressure to effect its removal and the retention of the aroma by the extract.

It is desirable to use a low boiling-point solvent, as the caffeol boils at a very low temperature. However, it is not absolutely essential that the solvent have a lower boiling-point than the caffeol, as the caffeol has a distinct affinity for the coffee-extract, which serves to retain the greater portion of the same when the solvent is evaporated. Having regard to these desirable properties of the solvent, we find that ethyl ether, pentane or a carbon chlorid are very desirable solvents, but, of course, we do not desire to be limited to these as many others could be used.

The absorbent, after having been separated from the solvent, can be re-used in the "enfleurage" apparatus, and the solvent can be condensed and re-used in subsequent repetitions of the process.

The extract is preferably pressed into the shape of cubes or other suitable forms, as may be desired, either before or after the addition of the caffeol. In order to prevent the escape of the caffeol, the blocks are covered, preferably with some water-soluble, physiologically inactive, neutral, non-deliquescent material, such as gelatin, albumen, casein, algin, etc., or combinations thereof; or the dry finished product may also be marketed in capsules of gelatin or other suitable material.

From the above description it is apparent that our invention consists in the broad steps above outlined and that the selection of equivalent absorbents, equivalent solvents, or the carrying out of the various steps of separation, are, after the broad nature of the process is revealed, largely within the province of any skilled chemist. We, therefore, do not wish to be limited to specific details in the carrying out of our process.

What we claim is:

1. A process for making an aromatized coffee extract, which consists in bringing volatilized caffeol into contact with an absorbing medium having substantially the enfleurage capacities of a petrolatum, treating the caffeol-charged absorbing medium with a solvent of the caffeol, separating the solution from the absorbing medium, concentrating a coffee solution to an extract by evaporation, and combining such extract and the caffeol of the solution separated from the absorbing medium.

2. The process for making an aromatized coffee extract, which consists in bringing volatilized caffeol into contact with an absorbing medium having enfleurage capabilities, treating the absorbing medium with a caffeol solvent of relatively low boiling point, separating the resulting solution from the absorbing medium, concentrating the coffee solution by evaporation to a dry powdered extract, combining the dry powdered extract and the solution bearing the caffeol, and driving off the caffeol solvent of low boiling point, the caffeol being retained by the extract because of its affinity therefor and because of the low temperature at which the caffeol solvent may be evaporated.

3. A process for making an aromatized coffee extract, which consists in bringing volatilized caffeol into contact with an absorbing medium having enfleurage capabilities, treating the absorbing medium with a caffeol solvent, separating the resulting solution from the absorbing medium, concentrating a coffee solution by evaporation to an extract, and combining the extract and the caffeol, the caffeol solvent being eliminated.

In testimony whereof, we sign this specification.

WILLIAM A. HAMOR.
CHARLES W. TRIGG.